United States Patent
Kim et al.

(10) Patent No.: US 10,913,591 B2
(45) Date of Patent: Feb. 9, 2021

(54) TEMPERATURE CONTROLLED CASE AND TEMPERATURE CONTROLLED PACKAGE INCLUDING THE SAME

(71) Applicant: OCI Co., Ltd., Seoul (KR)

(72) Inventors: Hyun Cheol Kim, Asan-si (KR); Jin Ho Yoon, Asan-si (KR); Young Soo Jung, Seongnam-si (KR); Seung Yeon Lee, Seongnam-si (KR)

(73) Assignee: OCI CO., LTD., Seoul (KR)

( * ) Notice: Subject to any disclaimer, the term of this patent is extended or adjusted under 35 U.S.C. 154(b) by 108 days.

(21) Appl. No.: 16/192,651

(22) Filed: Nov. 15, 2018

(65) Prior Publication Data

US 2019/0144193 A1    May 16, 2019

(30) Foreign Application Priority Data

Nov. 15, 2017   (KR) ........................ 10-2017-0152467

(51) Int. Cl.
*B65D 81/38*   (2006.01)
*B65D 81/18*   (2006.01)
*B29D 99/00*   (2010.01)

(52) U.S. Cl.
CPC ..... *B65D 81/3825* (2013.01); *B65D 81/3818* (2013.01); *B65D 81/3827* (2013.01); *B29D 99/0096* (2013.01); *B65D 81/18* (2013.01); *F25D 2303/08* (2013.01); *F25D 2303/082* (2013.01); *F25D 2303/083* (2013.01); *F25D 2303/08222* (2013.01)

(58) Field of Classification Search
CPC .......... F25D 2303/08; F25D 2303/083; F25D 2303/08222; B29D 99/0096
See application file for complete search history.

(56) References Cited

U.S. PATENT DOCUMENTS

| | | | | |
|---|---|---|---|---|
| 3,093,259 | A * | 6/1963 | Morrison ........... | B65D 11/1873 220/592.25 |
| 5,235,819 | A * | 8/1993 | Bruce ....................... | F25D 3/06 62/438 |
| 9,751,682 | B2 * | 9/2017 | Mayer ................ | B65D 81/3825 |
| 10,287,085 | B2 * | 5/2019 | Kuhn .................. | B65D 81/3823 |
| 2011/0290792 | A1 * | 12/2011 | Krzak ................ | B65D 81/3816 220/1.5 |
| 2015/0191291 | A1 * | 7/2015 | Wood .................. | B65D 81/3834 220/592.1 |

FOREIGN PATENT DOCUMENTS

GB            2534909 A  *  8/2016   ............... F25D 3/06

* cited by examiner

*Primary Examiner* — Frantz F Jules
*Assistant Examiner* — Lionel Nouketcha
(74) *Attorney, Agent, or Firm* — Seed IP Law Group LLP (57) ABSTRACT

Disclosed herein is a temperature controlled case. The temperature controlled case includes a base and a stepped portion protruding from an upper surface of the base, wherein the stepped portion has a rectangular shape having a major axis and a minor axis in top plan view, a height of the base is the same as a maximum height of the stepped portion protruding from the base, and maximum distances from an edge of the base to the stepped portion in the major axis and minor axis directions are the same as the height of the base or the maximum height of the stepped portion.

17 Claims, 9 Drawing Sheets

TEMPERATURE CONTROLLED CASE AND TEMPERATURE CONTROLLED PACKAGE INCLUDING THE SAME

CROSS-REFERENCE TO RELATED APPLICATION

This patent document claims priority to and the benefit of Korean Patent Application No. 10-2017-0152467, filed on Nov. 15, 2017, which is incorporated herein by reference for all purposes as if fully set forth herein.

TECHNICAL FIELD

Exemplary embodiments of the present disclosure relate to a temperature controlled case and a temperature controlled package including the same, and more particularly to a temperature controlled case that can be filled with a temperature regulating material and a temperature controlled package capable of storing a temperature sensitive object using the temperature controlled case.

BACKGROUND

Description of the Related Art

Generally, a temperature sensitive object manufactured or harvested at a manufacturing facility or a cultivation facility must be maintained at an appropriate temperature during transportation, and when the temperature is outside the appropriate temperature during transportation, the temperature sensitive object undergoes quality deterioration.

For transportation of the temperature sensitive object, a conventional transportation container requires a special device for maintaining the internal temperature thereof, for example, a cooler or an electric heater. However, such a conventional transportation container has a problem that power supply is continuously required.

Moreover, an alternative conventional transportation container is provided with ice in order to maintain the interior of the container at low temperature upon packaging. The alternative conventional transportation container is utilized only when there is a need to maintain a low temperature below a certain temperature or transportation can be finished in a relatively short time. However, the alternative conventional transportation container is not suitable for transportation of a temperature sensitive object that must be maintained within a certain temperature range.

For example, objects such as medical supplies, medicines such as cell therapy agents, blood and vaccines are very sensitive to temperature and must be delivered while being maintained in a predetermined temperature range. In addition, such temperature sensitive objects suffer from quality degradation as the time taken to pack the objects in a container increases.

Therefore, there is a need for development of a temperature controlled package that does not require separate power supply and enables rapid packaging of a temperature sensitive object while maintaining a temperature below a certain temperature, above a certain temperature, or within a certain temperature range.

BRIEF SUMMARY

Exemplary embodiments of the present disclosure provide a temperature controlled case that enables rapid packaging of a temperature sensitive object, and a temperature controlled package including the same.

In accordance with one exemplary embodiment of the present disclosure, there is provided a temperature controlled case including: a base; and a stepped portion protruding from an upper surface of the base, wherein the stepped portion has a rectangular shape having a major axis and a minor axis in top plan view, a height of the base is the same as a maximum height of the stepped portion protruding from the base, and maximum distances from an edge of the base to the stepped portion in major axis and minor axis directions are the same as the height of the base or the maximum height of the stepped portion.

In accordance with another exemplary embodiment of the present disclosure, there is provided a temperature controlled package including a hexahedral shape external box having an interior space and capable of being open or closed at one side thereof; and six temperature controlled cases disposed corresponding to six facets of the external box, wherein the six temperature controlled cases are the temperature controlled cases according to the exemplary embodiment of the present disclosure and are disposed to define the interior space of the hexahedral shape.

According to some exemplary embodiments of the present disclosure, the temperature controlled case can minimize deformation caused by volume expansion of a temperature regulating material received therein to allow a packaging container for storing a temperature sensitive object to be firmly assembled such that heat transfer between an interior space and an exterior space of the packaging container can be minimized, thereby allowing the interior space to be maintained in a temperature range required for the temperature sensitive object.

According to other exemplary embodiments of the present disclosure, a packaging container for storing a temperature sensitive object can be conveniently and rapidly assembled using temperature controlled cases having the same shape, thereby preventing the temperature sensitive object from suffering quality degradation during packaging.

BRIEF DESCRIPTION OF THE SEVERAL VIEWS OF THE DRAWINGS

The above and other aspects, features and advantages of the present disclosure will become apparent from the following description of embodiments given in conjunction with the accompanying drawings, in which.

DETAILED DESCRIPTION

Hereinafter, exemplary embodiments of the present disclosure will be described in detail. The following embodiments are provided by way of example so as to fully convey the spirit of the present disclosure to those skilled in the art to which the present disclosure pertains. Accordingly, the present disclosure is not limited to the embodiments disclosed herein and can also be implemented in different forms.

When an element or layer is referred to as being "disposed above" or "disposed on" another element or layer, it can be directly "disposed above" or "disposed on" the other element or layer or intervening elements or layers can be present. As used herein, spatially relative terms such as "upper" and "lower" are defined with reference to the accompanying drawings. Thus, it will be understood that "upper" can be used interchangeably with "lower."

Throughout the specification, like reference numerals denote like elements having the same or similar functions. In addition, as used herein, the singular forms "a," "an," and "the" may be intended to include the plural forms as well, unless context clearly indicates otherwise. Further, the terms "comprises," "comprising," "including," and "having" are inclusive and therefore specify the presence of stated features, integers, steps, operations, elements, components, and/or combinations thereof, but do not preclude the presence or addition of one or more other features, integers, steps, operations, elements, components, and/or combinations thereof.

Further, it should be understood that terms, such as width, height, major axis, and minor axis, indicate corresponding portions denoted by reference numerals in the accompanying drawings, unless particularly expressed by the term "length."

Further, as used herein, the term "temperature controlled container" refers to a container formed by assembling a plurality of temperature controlled cases, for example, six temperature controlled cases, according to exemplary embodiments of the present disclosure to have an interior space isolated from outside, and the term "temperature controlled package" refers to a package including the temperature controlled container and at least one external box.

One exemplary embodiment of the present disclosure provides a temperature controlled case including: a base; and a stepped portion protruding from an upper surface of the base, wherein the stepped portion has a rectangular shape having a major axis and a minor axis in top plan view, a height of the base is the same as a maximum height of the stepped portion protruding from the base, and maximum distances from an edge of the base to the stepped portion in the major axis and minor axis directions are the same as the height of the base or the maximum height of the stepped portion.

By way of example, a difference between a length of the stepped portion in the major axis direction and a length of the stepped portion in the minor axis direction may be two times the height of the base.

Here, a maximum length of the base in the minor axis direction may be the same as the length of the stepped portion in the major axis direction.

The stepped portion may include recessed portions for sliding disposed at opposite edges of an upper surface thereof, and the recessed portions may be disposed parallel to the minor axis direction.

A width of the recessed portion may be the same as the height of the stepped portion.

A height of the recessed portion may be half or less the height of the stepped portion. Here, the height of the recessed portion means a height from the bottom of the recessed portion to the upper surface of the stepped portion.

The stepped portion may have an orientation mark formed on the upper surface thereof to indicate the minor axis or major axis direction.

One exemplary embodiment of the present disclosure provides a temperature controlled package including: a hexahedral shape external box having an interior space and capable of being opened or closed at one side thereof; and six temperature controlled cases disposed corresponding to six facets of the external box, wherein the six temperature controlled cases are the temperature controlled cases according to the exemplary embodiment of the present disclosure and are disposed to define the interior space of the hexahedral shape.

The temperature controlled package may further include an insulator interposed between the temperature controlled cases and the external box.

In addition, a stepped portion of each of two temperature controlled cases disposed at opposite sides in a major axis direction of a first temperature controlled case disposed on a bottom surface of the external box may be placed on the stepped portion of the first temperature controlled case, a stepped portion of each of two temperature controlled cases disposed at opposite sides in a minor axis direction of the first temperature controlled case may be placed on a base of the first temperature controlled case.

Exemplary embodiments of the present disclosure will be described in detail with reference to the accompanying drawings.

Figure 1:
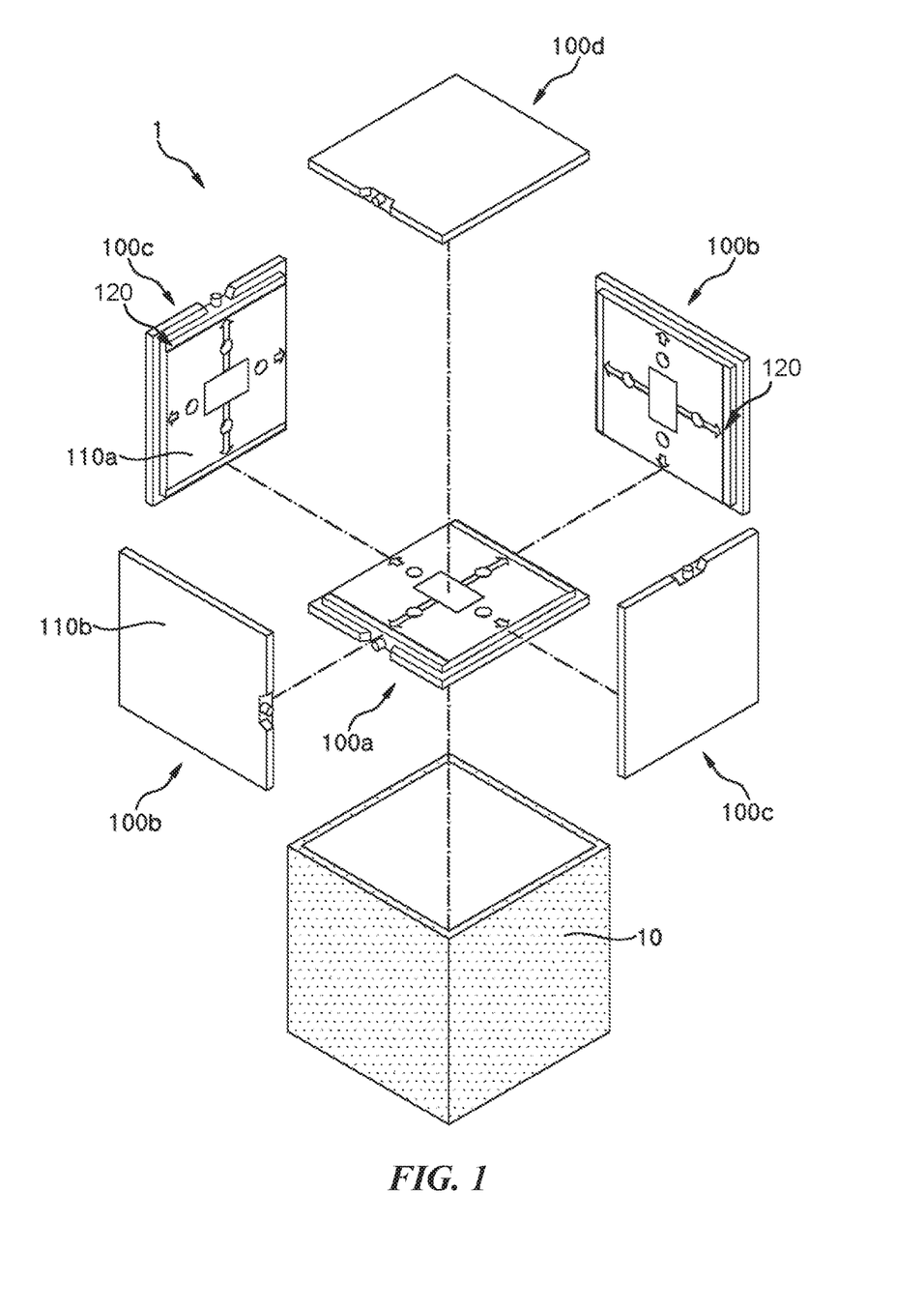
FIGS. 1-2 are exploded perspective views of a temperature controlled package capable of storing a temperature sensitive object according to one exemplary embodiment of the present disclosure.
Figure 2:
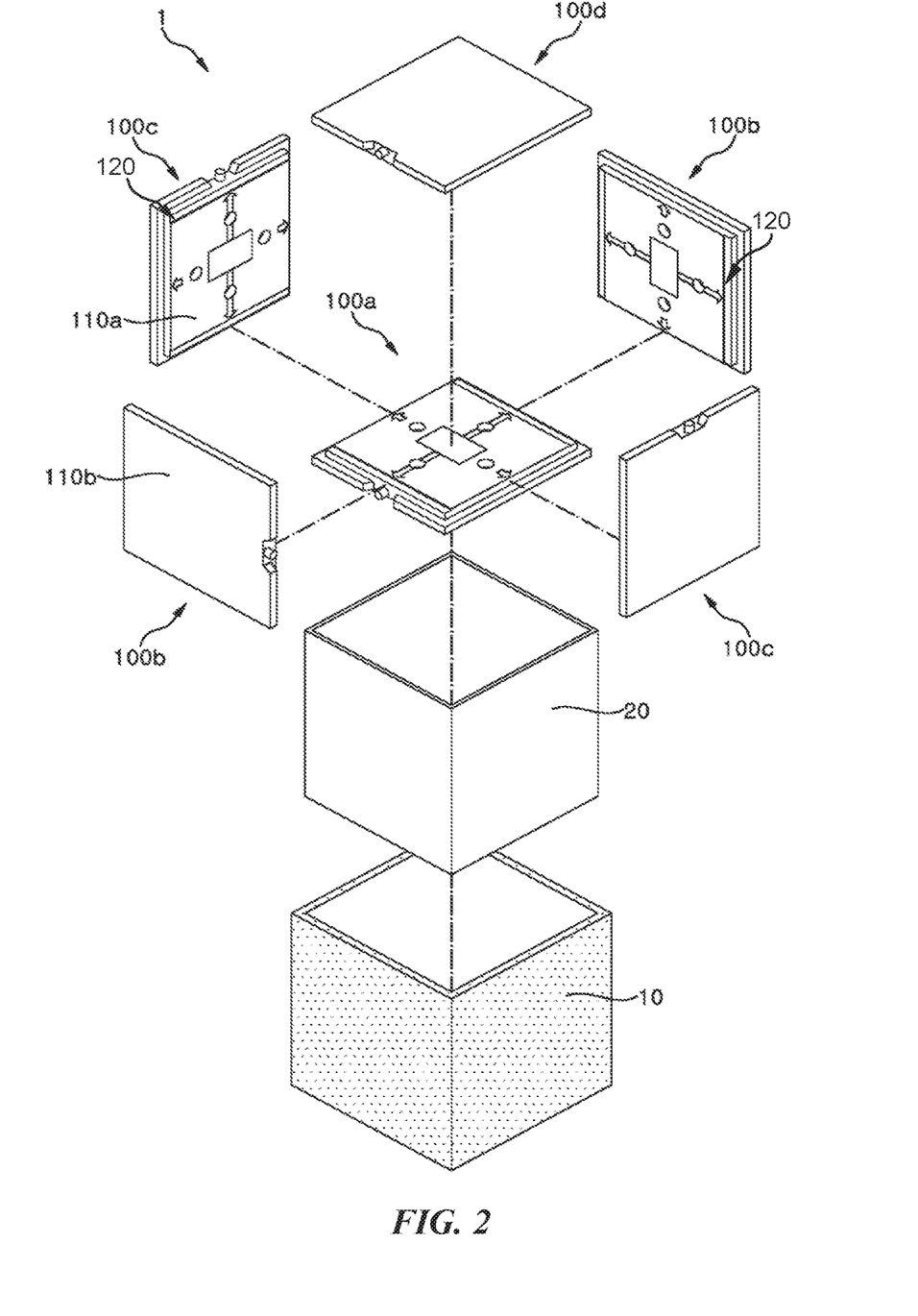

FIGS. 1-2 are exploded perspective views of temperature controlled packages capable of storing a temperature sensitive object according to one exemplary embodiment of the present disclosure.

Referring to FIG. 1, a temperature controlled package 1 capable of storing a temperature sensitive object includes a temperature controlled container and an external box 10.

As mentioned above, the temperature controlled container refers to a container formed by assembling a plurality of temperature controlled cases 100, for example, six temperature controlled cases, according to one exemplary embodiment of the present disclosure to have an interior space isolated from outside. Detailed shapes, and the number and functions thereof will be described with reference to FIGS. 3-10.

The external box 10 has a hexahedral shape that can be opened or closed at one side thereof or opened or closed at more than one side thereof. The external box 10 may be provided in an assembled state or may be composed of panels corresponding to six facets of the hexahedral shape. That is, the external box 10 has an interior space in which the temperature controlled container can be stored. Here, the external box 10 may have a size and a shape by which an outer surface of the temperature controlled container can be closely brought into contact with an inner surface of the external box 10.

The external box 10 may be formed of, for example, a synthetic resin or paper, without being limited thereto. The synthetic resin may include any resins without limitation so long as the synthetic resin does not allow self-reaction by a temperature regulating material and has durability. For example, the synthetic resin may include polypropylene, foamed polystyrene, copolymers, and the like.

Referring to FIG. 2, the temperature controlled package may further include an insulator 20. The insulator 20 serves to maintain the interior of the external box 10 at a constant temperature required for a temperature sensitive object 2. For example, the insulator 20 may be realized by a vacuum insulation panel (VIP). It is known in the art that the best thermal insulation function can be obtained in a vacuum. Since the vacuum insulation panel is manufactured by placing glass fibers in an air-tight encapsulation material and vacuum treatment of the interior of the encapsulation material, the vacuum insulation panel will provide good thermal insulation effects. In addition, the temperature controlled package may include at least one selected from the group consisting of extended polystyrene (EPS) foam, extruded polystyrene (XPS) foam, glass wool, aerogel, and mixtures thereof.

Figure 3:
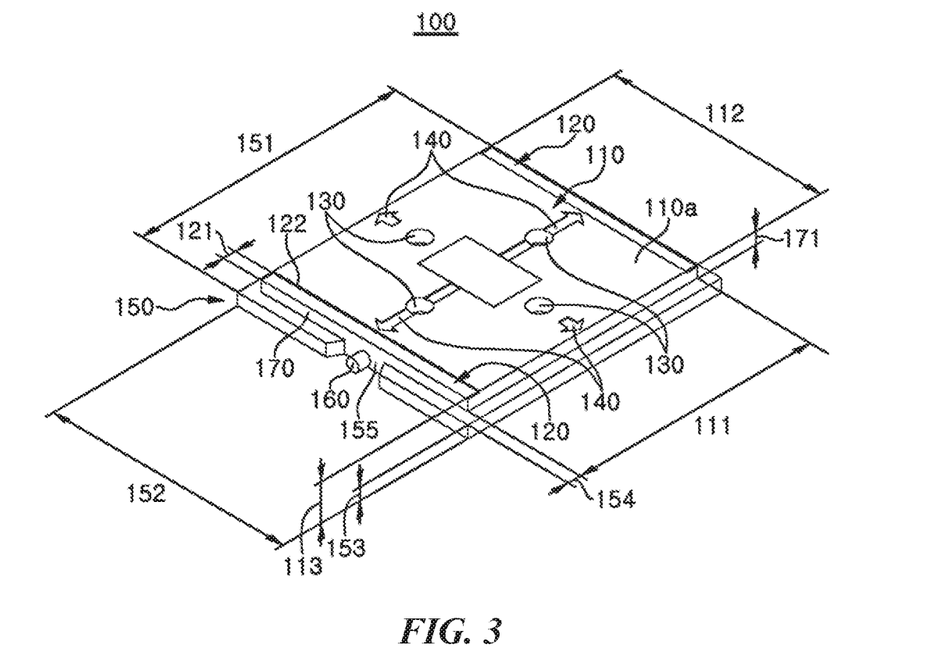
FIGS. 3-4 show a temperature controlled case according to one exemplary embodiment of the present disclosure.
Figure 4:
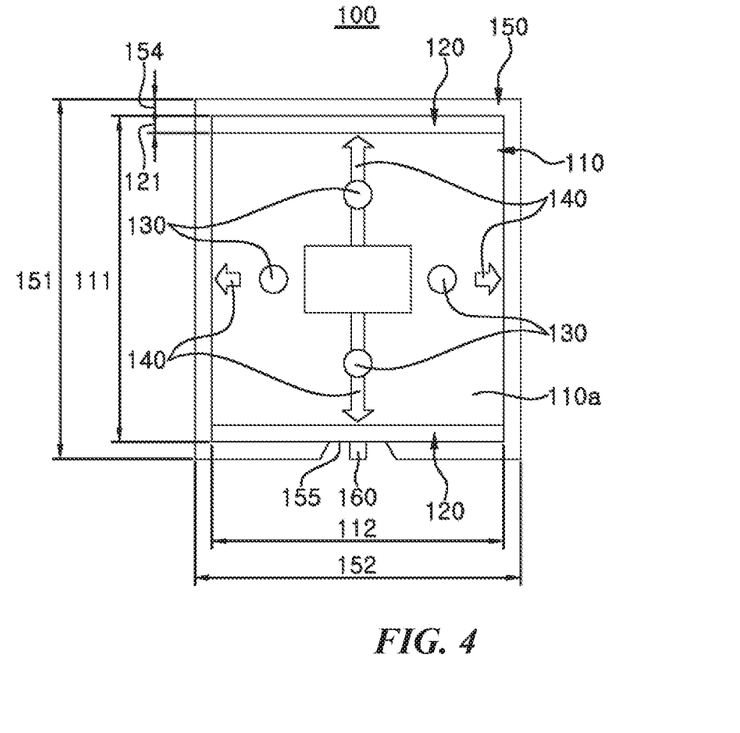

FIGS. 3-4 show a temperature controlled case according to one exemplary embodiment of the present disclosure.

Referring to FIG. 3 and FIG. 4, a temperature controlled case 100 includes a base 150 and a stepped portion 110 and may be adapted to receive a temperature regulating material (not shown) in the temperature controlled case 100.

The temperature controlled case 100 may be formed of, for example, a synthetic resin, without being limited thereto. The synthetic resin may include any resins without limitation so long as the synthetic resin does not allow self-reaction by a temperature regulating material and has durability. For example, the synthetic resin may include polypropylene, foamed polystyrene, low density polyethylene, copolymers, and the like.

In addition, the temperature controlled case 100 may include a flexible material. As a result, the temperature controlled case 100 can be prevented from being damaged upon volume expansion of the temperature regulating material filling the temperature controlled case 100.

The temperature controlled case 100 has a board shape including an inner surface 110a and an outer surface 110b as seen in FIG. 1, in which the inner surface 110a of the temperature controlled case defines a space receiving a temperature sensitive object 2 and the outer surface 110b of the temperature controlled case refers to a surface corresponding to the external box 10 or the insulator 20.

The base 150 and the stepped portion 110 may have a circular shape, an elliptical shape or a polygonal shape. In addition, when the temperature controlled case 100 is formed of a flexible material, the base 150 and the stepped portion 110 may not have a fixed shape. For example, in assembly of a plurality of temperature controlled cases 100 to form the temperature controlled container, the base 150 and the stepped portion 110 may have a rectangular shape in order to facilitate assembly in the process of matching each side while improving sealing force after assembly.

For example, the base 150 having a rectangular shape may have a base major axis 151, a base minor axis 152, a base protruding width 154, and a base height 153. Here, the base protruding width 154 refers to the maximum distance from an edge of the base 150 to the stepped portion 110 and the base height 153 refers to a portion of the temperature controlled case obtained by subtracting the height 171 of the stepped portion from the total height 113 of the temperature controlled case.

The base 150 may include a discontinuous portion 155 formed on at least a portion thereof. The discontinuous portion 155 may be provided with an injection port 160 through which the temperature regulating material is injected into the temperature controlled case 100. Although the injection portion 160 is not limited to a particular shape, the injection portion 160 may have a smaller length than the base protruding width 154 descried below to improve the sealing force of the temperature controlled container in assembly of the plurality of temperature controlled cases 100.

The temperature regulating material may have a solid phase, a liquid phase or a vapor phase. Specifically, the temperature regulating material may be a solid or liquid material in consideration of user convenience and maintenance of a particular temperature range.

For example, the temperature regulating material may be a phase change material (PCM). The phase change material refers to a material that can absorb or emit a large quantity of heat while changing the phase of the material from a solid phase to a liquid phase or vice versa at a certain temperature with substantially no temperature change. That is, the phase change material is able to emit heat as needed after storing surrounding heat, thereby enabling temperature adjustment there around, for example, temperature maintenance there around.

Upon phase change of the phase change material while maintaining the temperature, heat absorbed by or emitted from the phase change material is referred to as latent heat, which has an important role in energy storage. That is, since the latent heat has an energy storage capacity or a discharge capacity dozens or several hundred times greater than the sensible heat at a phase change temperature, the phase change material has a superior temperature control function to a conventional material using the sensible heat.

Examples of the phase change material may include hydrated inorganic salts, polyhydric alcohols, PET-PEG copolymers, PEG and PTMG, linear chain hydrocarbons, and the like. The hydrated inorganic salts may include hydrated calcium chloride, lithium nitrogen oxides, mangoes, and the like. Although the polyhydric alcohol generally has a phase change temperature of 40° C. or higher, the phase change temperature can be lowered when a mixture of two or more polyhydric alcohols is used. For example, a mixture of dimethyl propanediol (DMP) and hexamethyl propanediol (HMP) may be used. For the PET-PEG copolymer, when the average molecular weight of PEG (polyethylene glycol) is higher than 1,540 and the PEG content in the copolymer is controlled to exceed 50%, the PEG moiety can be solely crystallized. The melting point of PEG is proportional to the molecular weight when the molecular weight thereof is lower than 20,000, and PEG having a molecular weight in the range of 400 to 20,000 is known to have a melting point of 32° C. to 67° C. PTMG (polytetramethyl glycol) having a molecular weight of 3,000 is known to have a maximum theoretical melting point of 33° C. and a heat of fusion of 150 J/g. The linear-chain hydrocarbons may be obtained from by-products generated upon petroleum refining and hydrocarbons having 12 to 22 carbon atoms have a melting point and a crystallization point within the range of −10° C. to 44° C. The linear-chain hydrocarbons are known as non-toxic and inexpensive temperature regulating materials capable of being applied to various fields.

That is, the temperature controlled case 100 is filled with the temperature regulating material, such as a phase change material, to allow the surrounding temperature to be maintained in a predetermined temperature range.

The stepped portion 110 protrudes from the upper surface of the base 150, and has a stepped portion major axis 111, a stepped portion minor axis 112 and a stepped portion height 171. The stepped portion 110 may have a rectangular shape in top plan view. Here, the stepped portion major axis 111 may correspond to the base major axis 151 and the stepped portion minor axis 112 may correspond to the base minor axis 152.

The stepped portion 110 may include recessed portions 120 for sliding disposed at opposite edges of an upper surface thereof, and the recessed portions 120 may be disposed parallel to the minor axis direction. The recessed portion 120 has a predetermined width 121 and is formed to have a step on the upper surface of the stepped portion 110.

The recessed portion 120 may serve to buffer volume expansion of the temperature regulating material and may also serve to guide assembly of other temperature controlled cases 100, as described below. Here, a width 121 of the recessed portion may be the same as a height 171 of the stepped portion and a height 122 of the recessed portion 120, that is, the height 122 from the bottom of the recessed portion 120 to the upper surface of the stepped portion 110, is half or less of the height 171 of the stepped portion.

The stepped portion 110 may be provided with at least one depressed portion 130. The depressed portion 130 may serve to buffer volume expansion of the temperature regulating material. The depressed portion 130 is formed on the stepped portion 110 to be depressed toward the outer surface 110b of the temperature controlled case. Although the depressed portion 130 is not limited to a particular shape, at least one pair of depressed portions 130 may be formed corresponding to the center of the stepped portion minor axis 112 and/or the stepped portion major axis 111 when the stepped portion 110 is provided with a plurality of depressed portions 130.

The stepped portion 110 may be provided with a plurality of orientation marks 140. The orientation marks 140 formed on the stepped portion 110 may have a concave shape or a convex shape and allow a user to rapidly determine an assembly direction upon assembly of a packaging container for storing a temperature sensitive object 2 using the plurality of temperature controlled case 100. In addition, the orientation marks 140 having a concave shape serve to buffer volume expansion of the temperature regulating material.

For example, the orientation marks 140 include at least two shapes indicating the assembly direction of the temperature controlled cases 100 to allow a user to rapidly determine the assembly direction of the temperature controlled cases 100, thereby preventing deterioration in quality of the temperature sensitive object 2 during packaging of the temperature sensitive object 2 through reduction in time for assembling the temperature controlled container. By way of example, the orientation marks 140 having at least two different shapes may indicate the directions of the stepped portion major axis 111 and the stepped portion minor axis 112, respectively.

On the other hand, the temperature controlled case 100 according to this exemplary embodiment is provided to manufacture the temperature controlled container having improved sealing force by rapidly connecting the plurality of temperature controlled cases 100 having the same shape to each other, in which the stepped portion major axis 111, the stepped portion minor axis 112 and the stepped portion height 171 of the stepped portion 110, the width 121 of the recessed portion 120, and the base major axis 151, the base minor axis 152, the base protruding width 154 and the base height 153 of the base 150 have the following relationships.

For example, the length of the stepped portion major axis 111 may be the same as the length of the base minor axis 152. That is, the plurality of temperature controlled cases 100 may be assembled such that each of the stepped portion major axes 111 thereof adjoins the corresponding base minor axis 152, thereby improving a side sealing force of the temperature controlled container.

Here, a difference between the length of the base major axis 151 and the length of the base minor axis 152 may be the same as the difference between the length of the stepped portion major axis 111 and the length of the stepped portion minor axis 112. That is, in the structure wherein the length of the stepped portion major axis 111 is the same as the length of the base minor axis 152 and the difference between the length of the base major axis 151 and the length of the base minor axis 152 is the same as the difference between the length of the stepped portion major axis 111 and the length of the stepped portion minor axis 112, the interior space of the temperature controlled container assembled by connecting the temperature controlled cases 100 having a rectangular shape may have a hexahedral shape, thereby improving the temperature control function of the interior space.

For example, the maximum value of the stepped portion height 171 may be the same as the base height 153, and the length of the base protruding width 154 in the directions of the major axis 111 and the minor axis 112 of the stepped portion may be the same as the base height 153 or the maximum value of the stepped portion height 171.

For example, in the temperature controlled case 100, the difference between the length of the stepped portion major axis 111 and the length of the stepped portion minor axis 112 may be two times the base height 153. That is, when the base major axis 151 of a first temperature controlled case 100a is seated on the base protruding width 154 on the base minor axis 152 of a second temperature controlled case 100b and the stepped portion minor axis 112 of the first temperature controlled case 100a is seated on the base protruding width 154 on the base major axis 151 of the second temperature controlled case 100b, the base protruding width 154 on the base minor axis 152 overlaps the base height 153 on the base major axis 151 at the side of the assembled temperature controlled container, and the sealing force of the assembled temperature controlled container may be improved.

For example, the length of the base protruding width 154 may be the same as the length of the stepped portion height 171 and the length of the base height 153. Here, a step 170 may have a shape perpendicularly bent from the stepped portion 110, the base protruding width 154 may perpendicularly extend to the step 170, and the base height 153 may perpendicularly extend from the base protruding width 154. That is, when the stepped portion height 171 of the second temperature controlled case 100b is seated on the base protruding width 154 of the first temperature controlled case 100a, the base 150 of the second temperature controlled case 100b can be placed coplanar with an outer surface of the first temperature controlled case 100a and an inner surface 110a of the second temperature controlled case 100b can be brought into close contact with the stepped portion height 171 of the first temperature controlled case 100a, thereby improving the sealing force of the assembled temperature controlled container. Further, when the base protruding width 154 of the second temperature controlled case 100b is seated on the base protruding width 154 of the first temperature controlled case 100a, the stepped portion height 171 of the second temperature controlled case 100b is seated on the inner surface 110a of the first temperature controlled case 100a, thereby enabling firm assembly of the temperature controlled container.

FIGS. 5-10 show a method of assembling the temperature controlled package capable of storing a temperature sensitive object according to the exemplary embodiment of the present disclosure.

It should be understood that the terms, first temperature controlled case 100a, second temperature controlled case 100b, third temperature controlled case 100c, and fourth temperature controlled case 100d, are used herein to refer to the same shape of temperature controlled cases 100 and describe assembly directions instead of assembly sequence.

Figure 5:
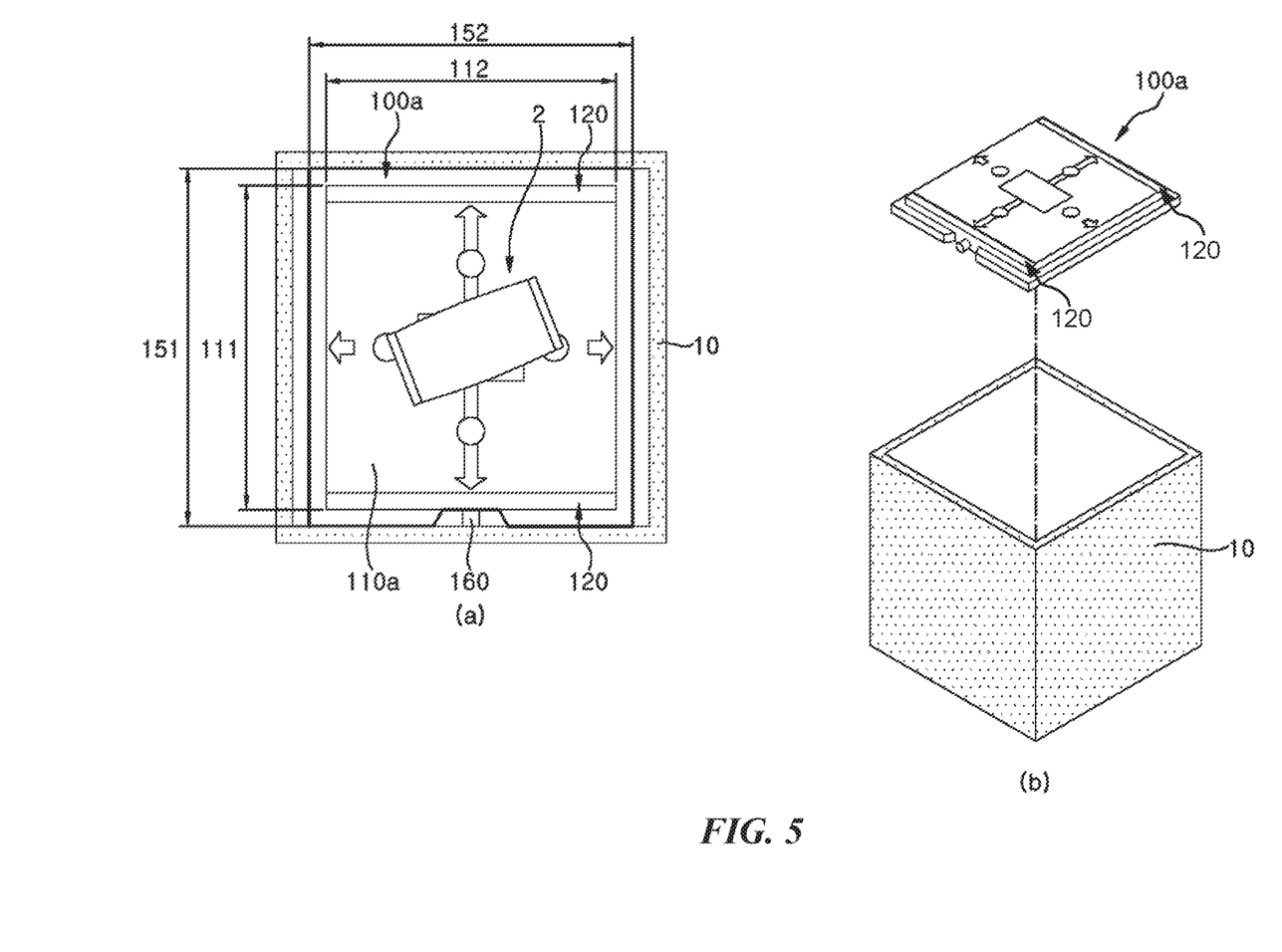
FIGS. 5-10 show a method of assembling the temperature controlled package capable of storing a temperature sensitive object according to the exemplary embodiment of the present disclosure.

Referring to FIG. 5, the first temperature controlled case 100*a* may be seated on a lower surface of the external box 10 such that, for example, the inner surface 110*a* of the temperature controlled case 100*a* faces upwards. Here, at least one of a pair of base minor axes 152 of the first temperature controlled case 100*a* may adjoin an inner surface of the external box 10. For example, the first temperature controlled case 100*a* may be slid into the external box 10 such that both ends of the first temperature controlled case 100*a* are brought into contact with the inner surface of the external box 10. Here, a temperature sensitive object 2 may be seated on the inner surface 110*a* of the first temperature controlled case 100*a*.

Figure 6:
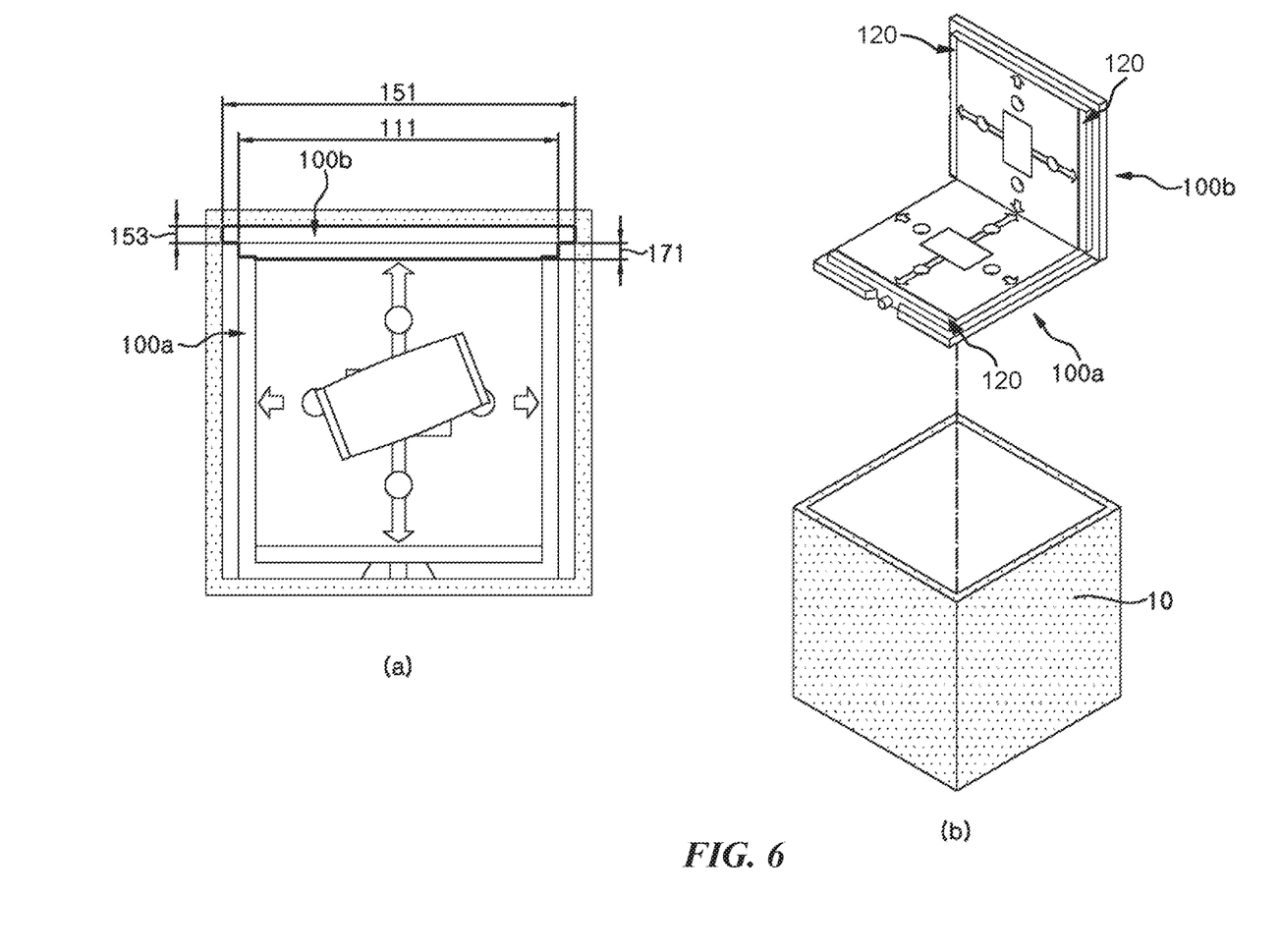

Referring to FIG. 6, the second temperature controlled cases 100*b* may be connected to the first temperature controlled case 100*a*. Here, each of the second temperature controlled cases 100*b* may be connected to the first temperature controlled case 100*a* such that the stepped portion minor axis 112 of the first temperature controlled case 100*a* is brought into contact with the stepped portion major axis 111 of the second temperature controlled case 100*b* and the base minor axis 152 of the first temperature controlled case 100*a* is brought into contact with the base major axis 151 of the second temperature controlled case 100*b*.

Here, the base 150 of the second temperature controlled case 100*b* may be seated on the base 150 of the first temperature controlled case 100*a*. In this case, the stepped portion height 171 of the second temperature controlled case 100*b* may be seated on the recessed portion width 121 of the first temperature controlled case 100*a* or may be separated a length corresponding to the recessed portion height 122 therefrom. As described above, the temperature controlled case 100 is provided with the recessed portions (120) to buffer volume expansion of the temperature regulating material, thereby enabling firm assembly of the temperature controlled container while improving the sealing force of the assembled temperature controlled container.

Figure 7:
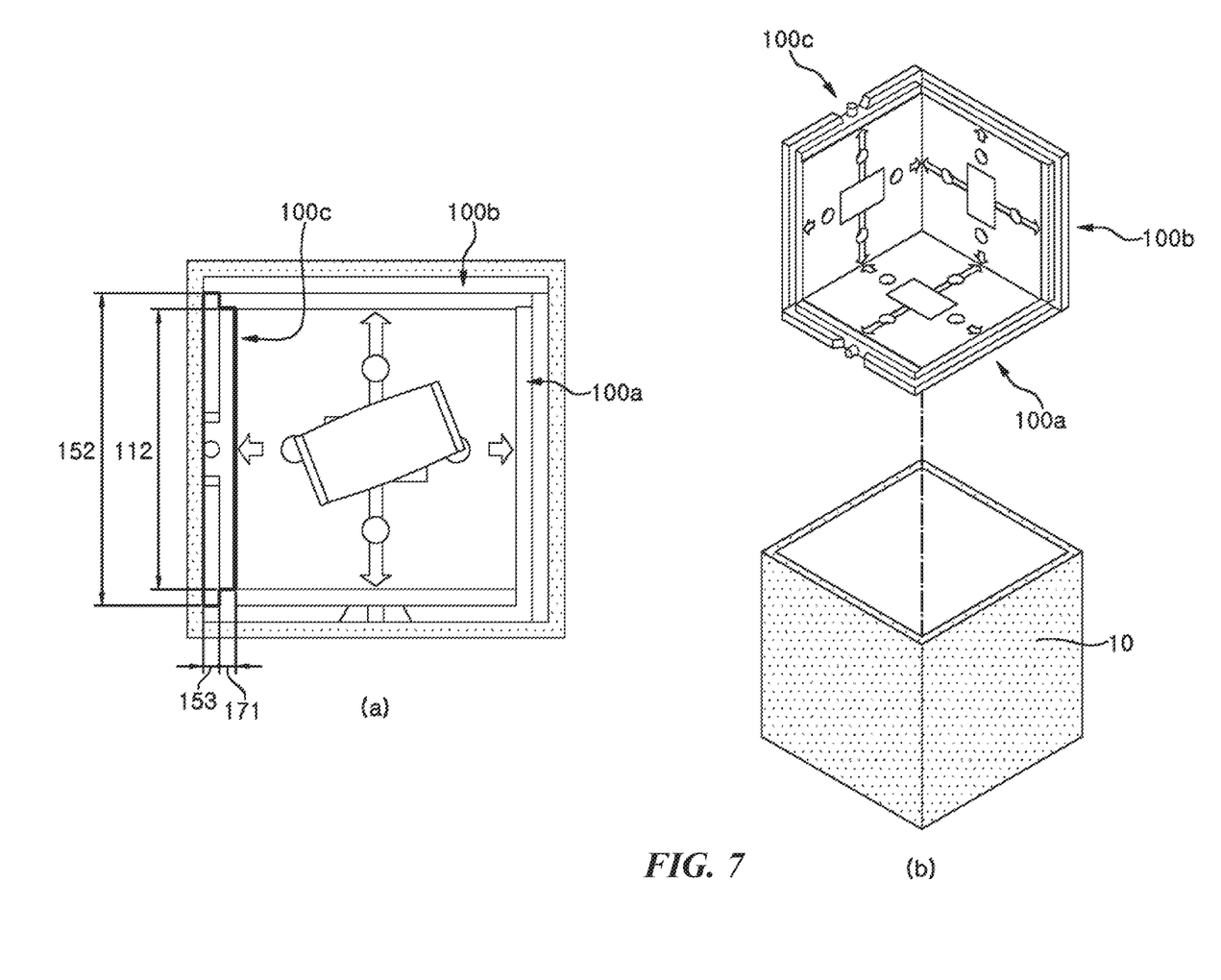

Referring to FIG. 7, the third temperature controlled cases 100*c* may be slid into a space between the inner surface of the external box 10 and the base major axis 151 of the first temperature controlled case 100*a*. Here, each of the third temperature controlled cases 100*c* may be slid into the space such that the stepped portion major axis 111 of the first temperature controlled case 100*a* is brought into contact with the stepped portion minor axis 112 of the third temperature controlled case 100*c* and the base major axis 151 of the first temperature controlled case 100*a* is brought into contact with the base minor axis 152 of the third temperature controlled case 100*c*. Here, the stepped portion 110 of the third temperature controlled case 100*c* may be seated on the base 150 of the first temperature controlled case 100*a*.

As such, the third temperature controlled cases 100*c* are connected to the first temperature controlled case 100*a* such that the stepped portion major axis 111 of the third temperature controlled case 100*c* corresponds to the stepped portion minor axis 112 of the second temperature controlled case 100*b* and the base major axis 151 of the third temperature controlled case 100*c* corresponds to the base minor axis 152 of the second temperature controlled case 100*b*, thereby improving the sealing force at the side of the temperature controlled container.

Figure 8:
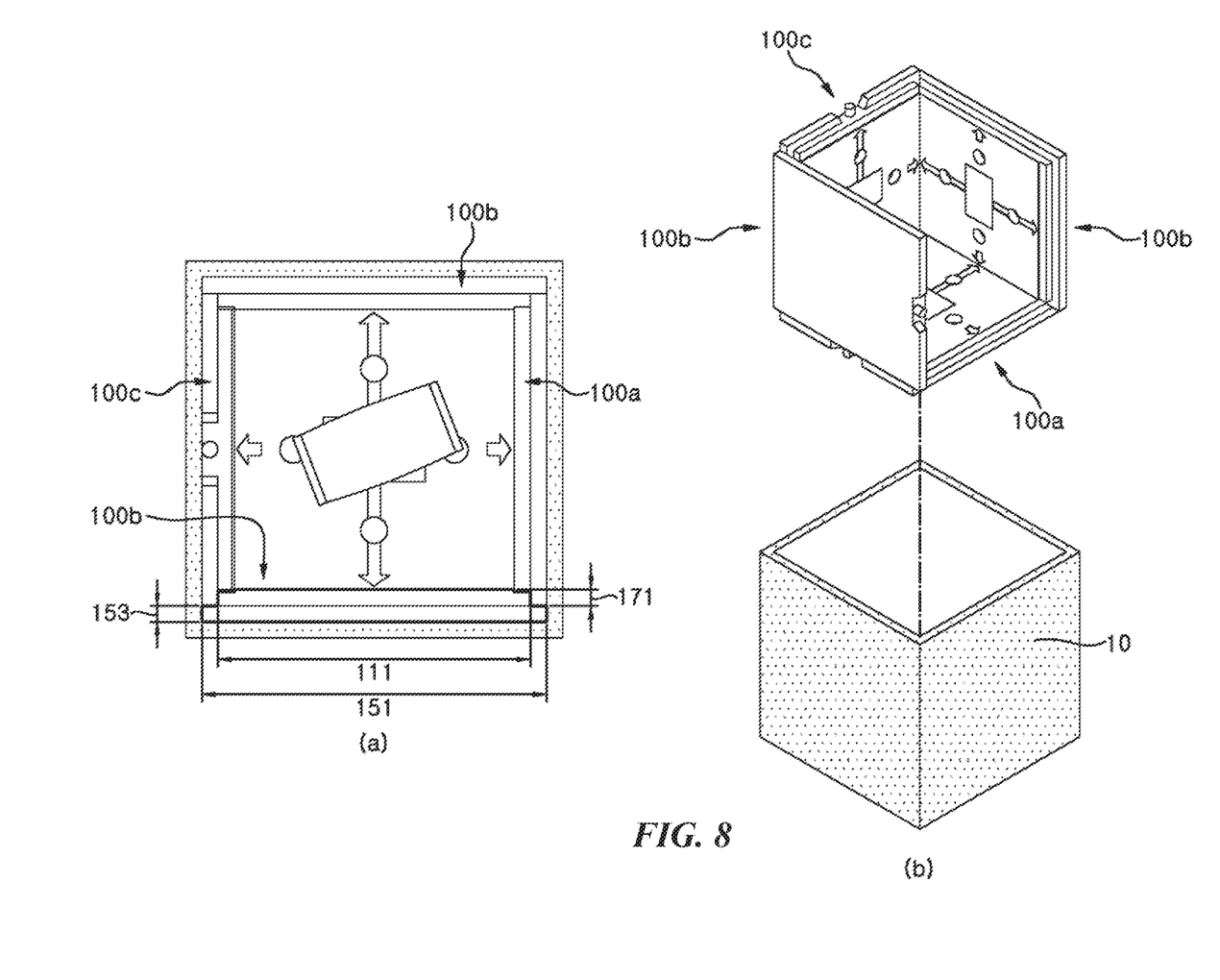

Referring to FIG. 8, the second temperature controlled cases 100*b* may be connected to the first temperature controlled case 100*a* by the method as described with reference to FIG. 6. Here, the second temperature controlled cases 100*b* may be connected to the first temperature controlled case 100*a* such that the stepped portion major axis 111 of each second temperature controlled case 100*b* is brought into contact with the stepped portion minor axis 112 of the first temperature controlled case 100*a* and the base major axis 151 of each second temperature controlled case 100*b* is brought into contact with the base minor axis 152 of the first temperature controlled case 100*a*. In addition, the base 150 of each second temperature controlled case 100*b* may be seated on the base 150 of the first temperature controlled case 100*a*. Further, the second temperature controlled cases 100*b* may be connected to the first temperature controlled case 100*a* such that the stepped portion minor axis 112 of each second temperature controlled case 100*b* is brought into contact with the stepped portion major axis 111 of the third temperature controlled case 100*c* and the base minor axis 152 of each second temperature controlled case 100*b* is brought into contact with the base major axis 151 of the third temperature controlled case 100*c*.

Figure 9:
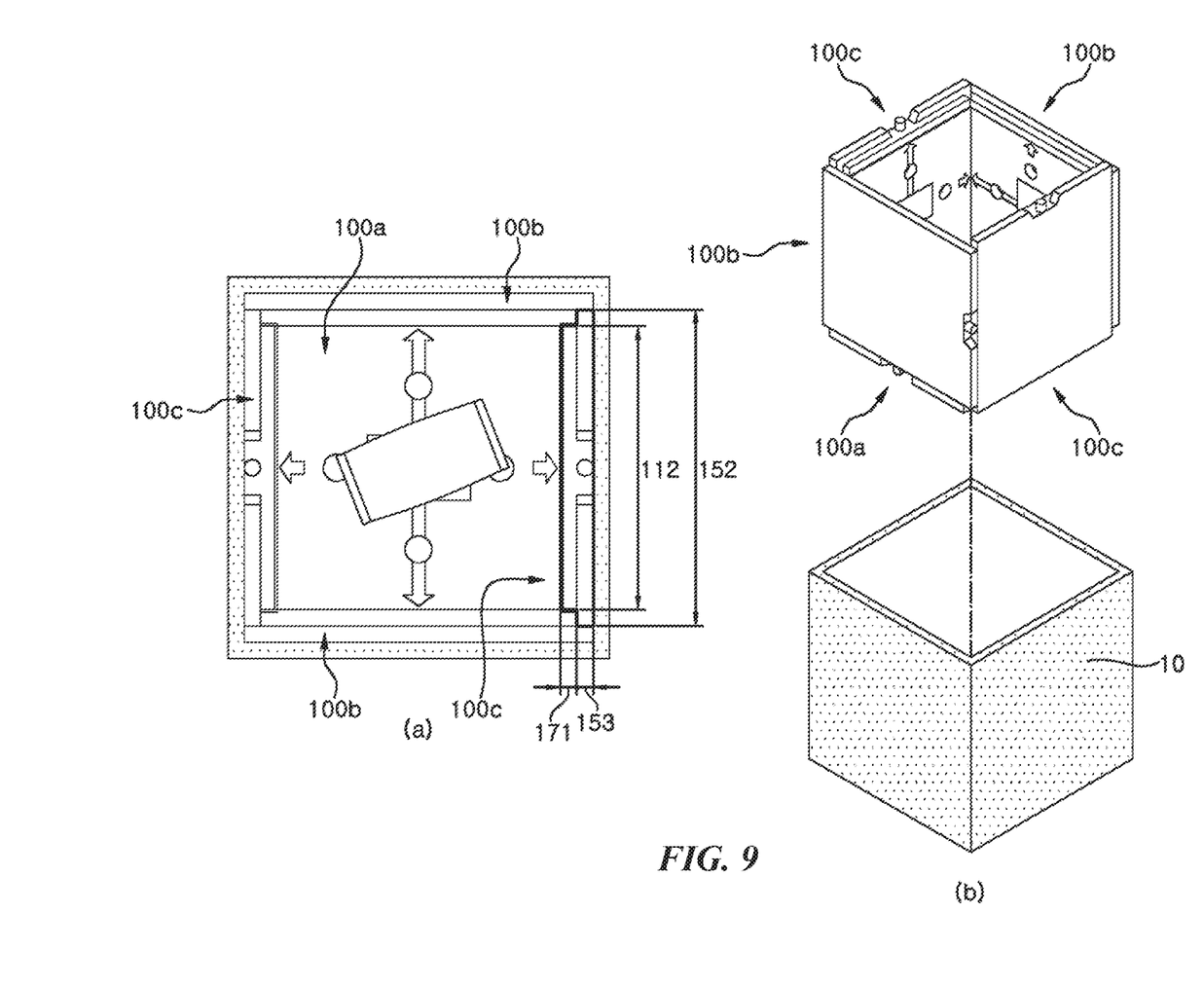

Referring to FIG. 9, the third temperature controlled cases 100*c* may be slid into a space between a pair of the second temperature controlled cases 100*b*. The third temperature controlled cases 100*c*, the first temperature controlled case 100*a* and the second temperature controlled cases 100*b* may be assembled by the method described with reference to FIG. 5 to FIG. 8. Here, when the third temperature controlled cases 100*c* are slid into the space between the second temperature controlled cases 100*b*, sliding insertion of the third temperature controlled cases 100*c* can be difficult due to volume expansion of the temperature regulating material, or the sealing force of the assembled temperature controlled container can be deteriorated. Accordingly, the temperature controlled case 100 according to the exemplary embodiments is provided with the recessed portions 120, thereby allowing easy insertion of the last temperature controlled case, for example, the third temperature controlled case 100*c* in FIG. 9, for forming a sidewall of the temperature controlled container as shown in FIG. 9, while improving the sealing force of the temperature controlled container.

Figure 10:
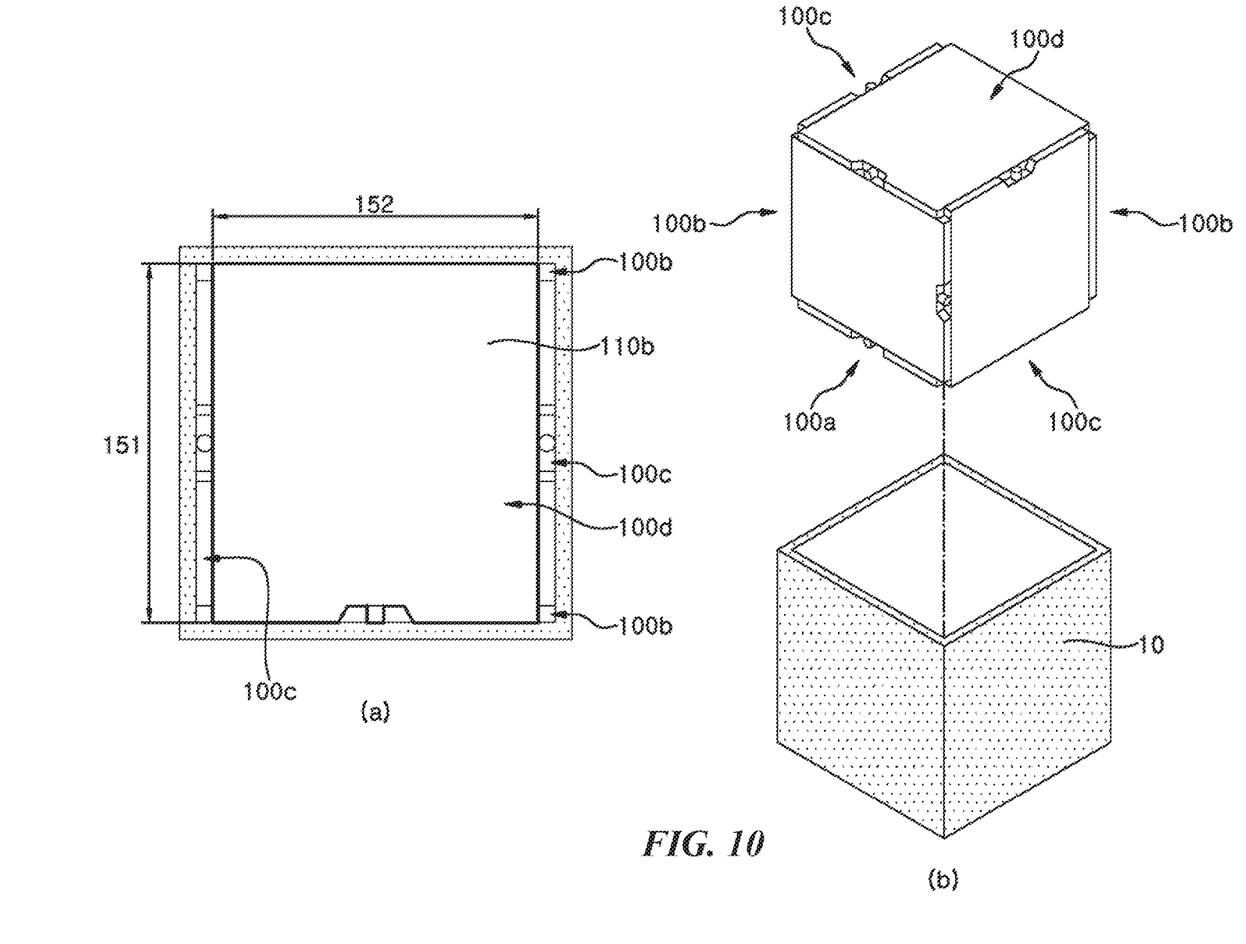

Referring to FIG. 10, the fourth temperature controlled case 100*d* is seated on the second temperature controlled cases 100*b* and the third temperature controlled cases 100*c*, thereby completing assembly of the temperature controlled container. The fourth temperature controlled case 100*d* may be assembled by the method of connecting the first temperature controlled case 100*a* to the second temperature controlled cases 100*b* and the third temperature controlled cases 100*c* by the method described with reference to FIG. 6 to FIG. 9.

For example, the fourth temperature controlled case 100*d* may be connected to the second and third temperature controlled cases such that the inner surface 110*a* of the fourth temperature controlled case 100*d* faces the inner surface 110*a* of the first temperature controlled case 100*a*; the stepped portion minor axis 112 of the fourth temperature controlled case 100*d* is brought into contact with the stepped portion major axis 111 of the second temperature controlled case 100*b*; the base minor axis 152 of the first temperature controlled case 100*a* is brought into contact with the base major axis 151 of the second temperature controlled case 100*b*; the stepped portion major axis 111 of the fourth temperature controlled case 100*d* is brought into contact with the stepped portion minor axis 112 of the third temperature controlled case 100*c*; and the base major axis 151 of the fourth temperature controlled case 100*d* is brought into contact with the base minor axis 152 of the third temperature controlled case 100*c*.

Here, in the temperature controlled container assembled by the above method, a space defined by the inner surfaces of the first temperature controlled case 100a, the pair of second temperature controlled cases 100b, the pair of third temperature controlled cases 100c, and the fourth temperature controlled case 100d has a hexahedral shape, thereby improving the temperature control function of the interior space.

On the other hand, it should be understood that the method of assembling the temperature controlled container described with reference to FIG. 5 to FIG. 9 does not limit the assembly sequence.

That is, the method of assembling the temperature controlled container according to the exemplary embodiments of the present disclosure is not limited to a particular assembly sequence and allows a user to achieve rapid packaging through rapid assembly, thereby preventing deterioration in quality of the temperature sensitive object 2. In addition, the temperature controlled case 100 is provided with the orientation marks 140 on the stepped portion 110 to allow a user to easily determine connection directions of the second temperature controlled cases 100b and the third temperature controlled cases 100c to the first temperature controlled case 100a so as to achieve rapid packaging through rapid assembly, thereby preventing deterioration in quality of the temperature sensitive object 2.

For example, after placing the first temperature controlled case 100a, the second temperature controlled case 100b, the third temperature controlled case 100c, the second temperature controlled case 100b, and the third temperature controlled case 100c may be sequentially connected to the first temperature controlled case 100a, or alternatively, the third temperature controlled case 100c, the second temperature controlled case 100b, the third temperature controlled case 100c, and the second temperature controlled case 100b may be sequentially connected thereto.

For example, after placing the first temperature controlled case 100a, the pair of second temperature controlled cases 100b may be connected to the first temperature controlled case 100a so as to face each other, followed by inserting the third temperature controlled cases 100c between the pair of second temperature controlled cases 100b.

For example, after placing the first temperature controlled case 100a, the pair of third temperature controlled cases 100c may be connected to the first temperature controlled case 100a so as to face each other, followed by inserting the second temperature controlled cases 100b between the pair of third temperature controlled cases 100c.

Although certain exemplary embodiments have been described herein, it should be understood by those skilled in the art that these embodiments are given by way of illustration only, and that various modifications, variations, and alterations can be made without departing from the spirit and scope of the disclosure. Therefore, the scope of the disclosure should be limited only by the accompanying claims and equivalents thereof.

LIST OF REFERENCE NUMERALS

1: temperature controlled package
2: temperature sensitive object
10: external box
20: insulator
100: temperature controlled case
100a: first temperature controlled case
100b: second temperature controlled case
100c: third temperature controlled case
100d: fourth temperature controlled case
110: stepped portion
110a: inner surface of temperature controlled case
110b: outer surface of temperature controlled case
111: stepped portion major axis
112: stepped portion minor axis
113: height of temperature controlled case
120: recessed portion
121: recessed portion width
122: recessed portion height
130: depressed portion
140: orientation mark
150: base
151: base major axis
152: base minor axis
153: base height
154: base protruding width
155: discontinuous portion
160: injection port
170: step
171: stepped portion height The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A temperature controlled case, comprising:
a base having:
an outermost edge;
a first surface;
a second surface opposite to the first surface;
a first portion having a first height extending from the second surface to the first surface;
a stepped portion having a second height protruding from the first surface of the base and the stepped portion being spaced apart from the outermost edge of the base by a selected distance, the stepped portion having a major axis and a minor axis transverse to the major axis, the first height being the same as the second height of the stepped portion protruding from the first portion, and the selected distances from the outermost edge of the base to the stepped portion in a major axis direction and minor axis direction being the same as the first height of the first portion, the stepped portion also having a third surface opposite to the second surface, a first recessed portion disposed at a first edge of the stepped portion and a second recessed portion at a second edge of the stepped portion opposite to the first recessed portion, the recessed portions separated by the third surface, the recessed portions being disposed parallel to the minor axis direction, each of the recessed portions having a fourth surface opposite to the second surface;

first sidewalls extending from the second surface to the first surface, the first sidewalls having the first height;

second sidewalls extending from the fourth surfaces of the recessed portions, respectively, to the third surface, the second sidewalls being spaced apart from the first sidewalls by the first surface and the fourth surfaces of the recessed portions, respectively, the second sidewalls having a third height; and third sidewalls extending from the first surface to the fourth surfaces of the recessed portions, respectively, the third sidewalls being between the first sidewalls and the second sidewalls, the third sidewalls having a fourth height that is a difference between the second height and the third height.

2. The temperature controlled case according to claim 1, wherein a difference between a first length of the stepped portion in the major axis direction and a second length of the stepped portion in the minor axis direction is two times the first height of the base.

3. The temperature controlled case according to claim 2, wherein a length of the base in the minor axis direction is the same as the first length of the stepped portion in the major axis direction.

4. The temperature controlled case according to claim 1, wherein widths of the fourth surfaces of the recessed portions extending from the third sidewalls to the second sidewalls is the same as the second height of the stepped portion.

5. The temperature controlled case according to claim 1, wherein the third height of the recessed portions is half or less the second height of the stepped portion.

6. The temperature controlled case according to claim 1, wherein the stepped portion has an orientation mark formed on the surface to indicate the minor axis direction or the major axis direction.

7. The temperature controlled case according to claim 1, wherein the temperature controlled case further includes an injection port coupled to the base.

8. The temperature controlled case according to claim 1, wherein the stepped portion further includes a depressed portion in a surface of the stepped portion.

9. The temperature controlled case of claim 1, wherein the recessed portions are configured to buffer volume expansion of a temperature regulating material in the base.

10. The temperature controlled case of claim 1, further comprising fourth sidewalls transverse to the first sidewalls, the second sidewalls, and the third sidewalls, the fourth sidewalls having the second height of the stepped portion.

11. A temperature controlled package capable of storing a temperature sensitive object, comprising:

an external box having an interior space and capable of being open or closed at a side; and a plurality of temperature controlled cases disposed corresponding to each facet of the external box, each of the temperature controlled cases being coupled to the interior surface of the external box, each one of the temperature controlled cases being coupled to another one of the temperature controlled cases, each one of the plurality of temperature controlled cases including:

a first surface;

a second surface opposite to the first surface;

a first sidewall extending from the first surface to the second surface, the first sidewall having a first height;

a third surface opposite to the first surface;

a second sidewall extending from the second surface to the third surface, the second sidewall having a second height that is less than the first height;

a fourth surface opposite to the first surface;

a third sidewall extending from the third surface to the fourth surface, the third sidewall having a third height that is less than the first height; and a fourth sidewall extending from the second surface to the fourth surface, the fourth sidewall being transverse to the first sidewall, the second sidewall and the third sidewall, the fourth sidewall having a fourth height equal to a summation of the second height and the third height.

12. The temperature controlled package according to claim 11, further comprising:

an insulator interposed between the temperature controlled cases and the external box.

13. The temperature controlled package of claim 11, wherein the external box has a hexahedral shape.

14. The temperature controlled package according to claim 13, wherein the stepped portions of at least two temperature controlled cases of the plurality of temperature controlled cases are disposed at opposite sides in the major axis direction of a first temperature controlled case of the plurality of temperature controlled cases that is disposed on a bottom surface of the external box, the at least two temperature controlled cases are placed on the stepped portion of the first temperature controlled case, and the stepped portions of another two temperature controlled cases of the plurality of temperature controlled cases are disposed at opposite sides in the minor axis direction of the first temperature controlled case, the at least another two temperature controlled cases are placed on a base portion of the first temperature controlled case, the first temperature controlled case is distinct from the at least two temperature controlled cases and the at least another two temperature controlled cases.

15. The temperature controlled package of claim 11, wherein the temperature controlled cases further include an injection port.

16. The temperature controlled package of claim 11, wherein the temperature controlled cases are filled with a temperature regulating material.

17. The temperature controlled package of claim 16, wherein the third surface and the third sidewall are configured to serve to buffer volume expansion of the temperature regulating material and serve to guide assembly of the plurality of temperature controlled cases.

* * * * *

UNITED STATES PATENT AND TRADEMARK OFFICE
CERTIFICATE OF CORRECTION

PATENT NO. : 10,913,591 B2  
APPLICATION NO. : 16/192651  
DATED : February 9, 2021  
INVENTOR(S) : Hyun Cheol Kim et al.

Page 1 of 1

It is certified that error appears in the above-identified patent and that said Letters Patent is hereby corrected as shown below:

In the Claims

Column 14, Claim 14, Line 38:
"portions of another two temperature" should read: --portions of at least another two temperature--.

Signed and Sealed this
Tenth Day of August, 2021

Drew Hirshfeld
*Performing the Functions and Duties of the*
*Under Secretary of Commerce for Intellectual Property and*
*Director of the United States Patent and Trademark Office*